United States Patent

Gureghian

[11] 4,398,755
[45] Aug. 16, 1983

[54] FLEXIBLE FLUID CONDUCTIVE COUPLING FOR FLUID TRANSFER SYSTEMS

[75] Inventor: Richard S. Gureghian, Burlington, Mass.

[73] Assignee: Barry Wright Corporation, Newton Lower Falls, Mass.

[21] Appl. No.: 225,896

[22] Filed: Jan. 19, 1981

[51] Int. Cl.³ .......................................... F16L 27/10
[52] U.S. Cl. ............................ 285/223; 285/DIG. 16
[58] Field of Search ............. 285/234, 223, 263, 231, 285/332.1, 233, 49, DIG. 16

[56] References Cited

U.S. PATENT DOCUMENTS

| | | | |
|---|---|---|---|
| 1,476,969 | 12/1923 | Howard | 285/231 X |
| 2,145,541 | 1/1939 | Forsberg | 285/223 |
| 3,504,903 | 4/1970 | Irwin . | |
| 3,504,904 | 4/1970 | Irwin et al. | 285/223 X |
| 3,680,895 | 8/1972 | Herbert et al. | 285/223 X |
| 3,797,864 | 3/1974 | Hynes et al. . | |
| 3,848,899 | 11/1974 | Smith . | |
| 4,045,054 | 8/1977 | Arnold | 285/261 X |
| 4,068,868 | 1/1978 | Ohrt | 285/223 X |
| 4,076,284 | 2/1978 | Herbert et al. | 285/263 |
| 4,198,078 | 4/1980 | Herbert | 285/234 |

FOREIGN PATENT DOCUMENTS

| | | | |
|---|---|---|---|
| 2425121 | 12/1974 | Fed. Rep. of Germany | 285/223 |
| 409971 | 3/1945 | Italy | 285/233 |
| 542208 | 12/1941 | United Kingdom | 285/223 |
| 641329 | 8/1950 | United Kingdom | 285/223 |
| 1189052 | 4/1970 | United Kingdom . | |
| 1514431 | 6/1978 | United Kingdom . | |
| 1553096 | 9/1979 | United Kingdom . | |

*Primary Examiner*—Dave W. Arola
*Attorney, Agent, or Firm*—Milton E. Gilbert; Gary E. Ross

[57] ABSTRACT

A flexible fluid conductive coupling for use with fluid flow systems has short fluid conductive cylindrical sections having different diameters so chosen that the smaller diameter section may fit within, and well clear of, the larger. A pair of external mating flanges are provided at the end and near the end, respectively, of the larger and the smaller cylindrical section, and a combination coupling and seal laminated from alternating layers of resilient and rigid materials is held in compression between these two flanges. The facing surfaces of the flanges are shaped to provide for the desired motion or displacement. The slight extension of the smaller cylindrical section into the larger provides a stagnation region between the two cylindrical sections, thereby protecting the seal from abrasive injury which might be caused by particulate matter in the fluid stream.

12 Claims, 2 Drawing Figures

FLEXIBLE FLUID CONDUCTIVE COUPLING FOR FLUID TRANSFER SYSTEMS

BACKGROUND OF THE INVENTION

This invention relates to fluid conductive couplings for fluid transfer conduits and more particularly to such couplings which are flexible and can accomodate, without failure, linear as well as angular displacements between the confronting ends of the conduits coupled thereby.

Flexible fluid conductive couplings are well known, and are employed in a variety of applications where it is desired to connect together conduit sections of a fluid transfer system so as to permit displacement or misalignment of the conduit sections relative to one another. Typical uses are in systems in which alignment of the conduit sections cannot be assured because of considerations of mechanical tolerance and relative motion between the sections (as may be produced by thermal expansion, vibration, system operation, or the like).

A commonly encountered coupling, particularly in systems in which a large torque must be communicated from one conduit section to another (as in well drilling apparatus) or in which the internal fluid pressure is greatly different from the external pressure, is a ball and socket type joint incorporating a distortable combination seal and bearing laminated from alternating layers of relilient and rigid material, such as disclosed in U.S. Pat. Nos. 3,680,895 and 4,068,868. Such joints, however, are dimensioned on the basis of the size of the joined conduit, the radius of the ball and socket being only slightly larger than that of the conduit, and therefore do no necessarily provide for optimum torque coupling through the laminated seal. Further, such joints when used singularly will only accommodate lateral angular misalignment of the joined conduit sections. To accommodate lateral linear motion or misalignment of a pair of conduits as well, a compound coupling comprising a pair of such ball and socket joints separated by a third section of conduit may be employed. Alternatively, both linear and angular lateral motion or misalignment may be accommodated by a coupling comprising a section of flexible conduits.

The compound type of flexible coupling accommodates relative linear motion between the conduit sections it joins together by rotating about an axis normal to the motion. In doing this, the compound coupling produces an adverse couple, i.e., a linear relative motion between its ends normal to both the original linear motion being accommodated and the axis of rotation, and the laminated seals of the ball and socket joints must provide for this adverse coupling to prevent stress on the conduit or joints or parting of the seal. In order to minimize the adversely coupled linear motion, the compound couple should extend between the conduits to be joined in a direction substantially normal to the motion to be accommodated and should have a dimension greater than the motion by as large a factor as possible. These spatial requirements of a compound flexible coupling represent a disadvantage in that they may be in conflict with other requirements of the fluid transfer system (e.g., short pipe run, compact system, etc.).

An additional disadvantage of the compound flexible coupling is in its complexity, in that it requires a pair of ball and socket joints, each having a laminated seal. This not only results in higher fabrication, installation, and maintenance costs, but impacts on the reliability of the coupling as well. Inasmuch as the seal constitutes a source of potential fluid transfer system failure, the use of couplings requiring a multiplicity of distortable seals may not be desirable in critical situations (i.e., situations in which access to the seals for maintenance or replacement is difficult or systems in which loss or contamination of fluid results in excessive danger or damage).

These disadvantages may be overcome, in part, by a coupling incorporating a flexible conduit section bonded securely between the sections of the fluid transfer system to be joined. Such a flexible coupling accommodates relative motion between the conduit sections it joins through the resilient distortion of its walls, and may accommodate, without undue adverse coupling, both linear and rotational motion. Further, such a flexible coupling may avoid the problems of complexity and seal integrity characteristic of the compound ball and socket coupling. However, although potentially shorter than the compound ball and socket coupling (because of its smaller adverse coupling) the extent of the flexible conduit in the direction of fluid flow is still considerable. Further, the flexible conduit is itself a weak link in a fluid transfer system, having a higher susceptibility to failure under extremes of pressure and a smaller torque transmitting capability than does the ball and socket coupling.

In either the compound ball and socket or the flexible conduit type flexible coupling, the component most subject to failure (i.e., the laminated seal or the resilient wall) is not only subject to mechanical loads (e.g., vibration and power transmission, either translational or rotational) and fluid pressure, but also is generally exposed, at least in part, to the fluid stream. This may result in excessive wear of these critical componets in cases where the fluid stream contains particulate matter.

OBJECTS OF THE INVENTION

Accordingly, it is an object of the present invention to provide a flexible fluid conductive coupling for use with fluid transfer systems which can accommodate both linear and angular displacements of the conduit sections it joins, producing little adverse coupling, yet can withstand extremes of pressure and is relatively compact, requiring little length in the fluid transfer system.

Another object of the invention is to provide a flexible fluid conductive coupling for fluid transfer systems which can accommodate linear and angular displacements of the conduits it joins and which can be configured to transmit maximum torque.

Yet another object of the invention is to produce such a flexible coupling which requires but a single sealing joint, and which is relatively simple to fabricate, install, and maintain.

A further object of the invention is to provide a flexible fluid conductive coupling for use with a fluid flow system in which the resilient seal is protected from the fluid stream, in order that the coupling may have a longer life in fluid flow systems in which the flow stream contains particulate matter.

SUMMARY OF THE INVENTION

These and other objects are met in the present invention of a flexible fluid conductive coupling for use with fluid flow systems in which the conduits to be joined are terminated in short fluid conductive cylindrical sections having different diameters so chosen that the smaller diameter section may fit within, and well clear of, the larger. A pair of external mating flanges are provided at the end and near the end, respectively, of the larger and the smaller cylindrical section, and a combination coupling and seal laminated from alternating layers of resilient and rigid materials is held in compression between these two flanges. The facing surfaces of the flanges (and the laminated seal) are shaped to provide for the desired motion or displacement. In a preferred embodiment, they are sectors of a large diameter sphere, thereby providing accommodation for both (small) angular and (moderate) linear motion or displacement of the conduit axes, the extent of the motion being limited by the clearance between the two cylindrical sections.

The slight curvature of the flanges allows considerable linear displacement with little adverse coupling. The use of a laminated seal provides a system capable of operation with extreme pressure differentials. The extent of the flanges and the laminated seal allow the resilient seal to be dimensioned for maximum torque transmission. The slight extension of the smaller cylindrical section into the larger not only serves as a limiting stop, preventing the obstructions of the flow stream by too great a displacement of the two conduits, but also provides a stagnation region between the two cylindrical sections, thereby protecting the seal from abrasive injury which might be caused by particulate matter in the fluid stream; it need only be as long as required to limit motion and provide a stagnation region. Consequently, the extent of the coupling in the direction of fluid flow need only exceed the dimension of the flanges and the seal by an amount necessary to provide the taper(s) to join the cylindrical sections to their respective conduits.

Other objects of the invention will in part by obvious and will in part appear hereinafter. The invention accordingly comprises the construction, combination of elements, and arrangement of parts which are exemplified in the following detailed disclosure, and the scope of the application of which will be indicated in the claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION

Figure 1:
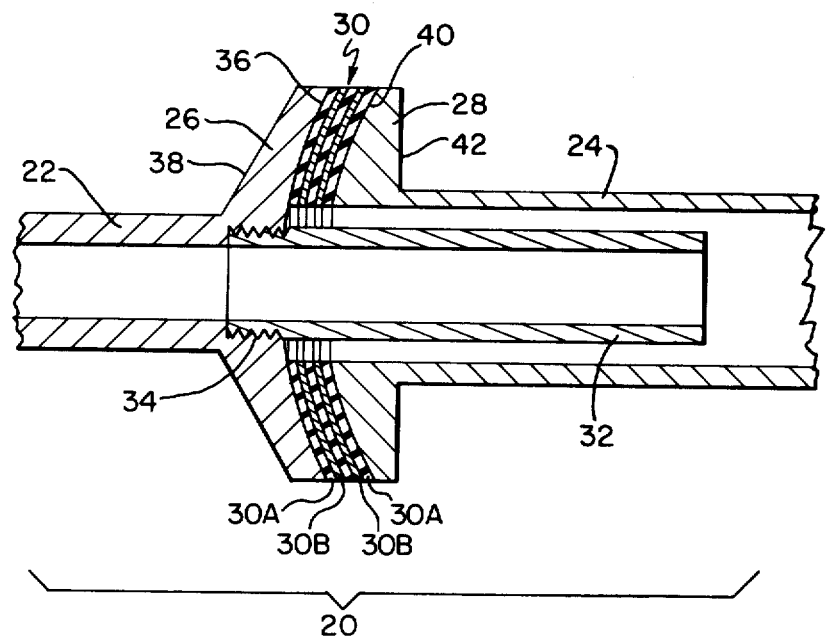
FIG. 1 is a longitudinal cross-sectional view of a preferred embodiment of the flexible fluid conductive coupling of the present invention, configured to accomodate lateral linear and angular relative motion between the conduit sections thereby joined.

Referring to FIG. 1, there may be seen a prefered embodiment of the present invention in the form of a flexible fluid conductive coupling 20 for incorporation into a fluid transfer system (not shown) and configured to accommodate both angular and linear relative lateral motion between a pair of nominally colinear fluid conductive conduits of the system. Coupling 20 is also configured to transmit between the conduits a torque about the conduit's axes. Coupling 20 incorporates conduit sections 22 and 24, provided respectively with opposing external radial flanges 26 and 28, between which is disposed an annular bearing and seal assembly 30.

Conduit sections 22 and 24 are unequal diameter open-ended substantially right circular cylindrical thin-walled tubes. The smaller of the inside diameters of the conduit sections is chosen to be at least as large as required by the fluid handling design goals of the system. The larger of the conduit sections (24) is provided with an inside diameter in excess of that of the smaller section by an amount dependent inter alia on the total lateral motion to be accommodated, as will be described hereinafter. The wall thicknesses of the two conduit sections are selected on the basis of the strength of the material of construction, to support both the mechanical and fluid pressure loading of the sections, as will be understood by those skilled in the art. Conduit sections 22 and 24 are in effect substantially coaxial extensions of the pair of conduits to be joined, and may either be parts integrally formed from their respective conduits or may be initially separate parts bonded to the conduits by any of a number of well known methods, as, for instance, by sweating or welding. It will be understood that appropriate fairings may be necessary between conduit sections 22 and 24, as for instance in case the conduits to be joined are of equal diameter.

The smaller diameter conduit section (22) is provided with an extension tube 32 in the form of an open-ended substantially right circular cylindrical thin walled tube having an inside diameter substantially equal to that of conduit section 22. In use extension tube 32 is immersed in the fluid being conveyed by the fluid transfer system, and consequently is not subject to differential fluid pressure loading. Further, extension tube 32 is not a part of the torque transmission train, and normally does not experience appreciable mechanical loads. Consequently, the wall thickness and outside diameter of extension tube 32 may be less than those of conduit section 22. As the inside diameter of conduit section 24 must excede the outside diameter of extension tube 32 by somewhat more than the total lateral displacement to be accommodated, it is preferable that the outside diameter (and therefore, the wall thickness) of extension tube 32 be minimized to insure a compact coupling 20. It will be appreciated, however, that extension tube 32 may have any desired wall thickness and outside diameter, and may, in particular, be identical in lateral section to conduit section 22. As will be further described hereinafter, the purpose of extension tube 32 is to provide a stagnation region in the fluid conducted through the coupling, and therefore its minimum axial length is dependent on the properties of the fluid stream. Extension tube 32 is affixed to conduit section 22, as by threads 34, so as to extend substantially coaxially therefrom. Alternatively, extension tube 32 may be formed as an integral part of conduit section 22.

Flange 26 is affixed externally to conduit section 22 at the junction between the conduit section and extension tube 32. Flange 26 extends radially from conduit section 22 a distance depending on the torque to be transmitted and the lateral deflections to be accommodated, as will become apparent. Preferably flange 26 is provided with a spherical surface 36 and a spaced-apart conical surface 38, although as will be described hereinafter the form of these surfaces may be altered for specific applications. Spherical surface 36 is formed on the surface of flange 26 nearest extension tube 32, is centered substantially on the axis of conduit section 22 and is concave toward extension tube 32. The radius of curvature of spherical surface 36 is chosen on the basis of the relative motion to be accommodated, and for lateral linear displacements is chosen to be at least several times the diameters of the conduits. For reasons of clearance, as will be discussed hereinafter, this radius is likewise chosen to be greater than half the axial length of extension tube 32. Conical surface 38, coaxial with conduit section 22, is formed on the other radial surface of flange 26. In the preferred embodiment, conical surface 38 is steeply inclined (e.g., on the order of at least 60 degrees) to its axis, the conical surface becoming further from spherical surface 36 as it approaches its apex. The thickness of flange 26 (i.e., the separation between surfaces 36 and 38) is chosen, on the basis of the strength of the material of construction, to be sufficient to support the mechanical loads on the flange, as will be understood by those skilled in the art.

Conduit section 24 is provided with an external radial flange 28 conterminous with the free end of the section. Flange 28 has an outer diameter equal to that of flange 26. Flange 28 is provided with a spherical surface 40 and a spaced-apart plane surface 42. Spherical surface 40 is formed on the surface of flange 28 conterminous with the open end of conduit section 24, is centered substantially on the axis of conduit section 24 and is convex away from the conduit section. The radius of curvature of spherical surface 40 is selected to be less than that of spherical surface 36 by an amount equal to the thickness of bearing and seal assembly 30 as will be described. Plane surface 42 is normal to the axis of conduit section 24 and is spaced apart from spherical surface 40 a distance sufficient to insure the mechanical integrity of flange 28.

Bearing and seal assembly 30 is in the form of an annular segment of a sphere, the inner and outer diameters of the annulus corresponding to the inner and outer diameters of conduit section 24 and flange 28, respectively. The spherical surfaces of bearing and seal assembly 30 are configured to match spherical surfaces 36 and 40. Bearing and seal assembly 30 is a laminated structure built up of alternating layers, 30A and 30B, of resilient and relatively rigid material, respectively. Each layer is in the form of a hollow spherical segment, the curvatures of the layers being graduated so that the assembly is a laminate of concentric segments. The outermost layers, 30A, are of the resilient material. Bearing and seal assembly 30 may be made, as is well known in the art, by casting an elastomer into a mold in which rigid elements 30B have been positioned, the elastomer setting up to become resilient layers 30A. Elements 30B are preferably made of a suitable metal or alloy.

Coupling 20 is assembled by placing the convex surface of bearing and seal assembly 30 in confronting relationship with spherical surface 36 of flange 26, inserting extension tube 32 into conduit section 24, bringing flanges 26 and 28 into contact with the opposing outer resilient layers 30A of assembly 30 and bonding the outermost layers 30A to flanges 26 and 28. In a typical application, coupling 20 is held, with bearing and seal assembly 30 in compression, by opposing thrust bearings (not shown) acting on conical surface 38 of flange 26 and plane surface 42 of flange 28. It will be appreciated by those skilled in the art that a conical thrust bearing acting on conical surface 38 may be used not only to supply a portion of this compressional force, but also to center conduit section 22. It will also be understood that a simple ball and race thrust bearing may be used to supply an opposing compressional force to plane surface 42 while permitting lateral motion of conduit section 24.

When coupling 20 is restrained as so far described, bearing and seal assembly 30 may be used not only as a fluid seal, but also as a shock- and vibration-absorbing mechanical torque coupling. In this latter respect, the resilient shearing of layers 30A of the assembly may be used to both isolate conduit sections 22 and 24 from one another with regard to both angular and radial shock and vibration with respect to the conduits' longitudinal axes while providing a mechanical coupling between them for relatively uniform angular motion. To this end, it should be noted that the compressional force exerted on bearing and seal assembly 30 should only be sufficient to insure good mechnical contact between the assembly and confronting spherical surfaces 36 and 40, insuring a fluid seal and sufficient frictional forces between the seal and the surfaces for the communication of motion. Too great a compressional load, imposed, for instance to improve the seal or increase the frictional force between the conduits and the assembly, will impare the isolation afforded by the assembly. An important feature of the present invention is that the outside diameters of flanges 26 and 28 and of bearing and seal assembly 30 may be modified to vary the surface areas in contact, thereby varying the amount of isolation and torque afforded by the coupling under a given compressional load.

The slight curvature (large radii) of spherical surfaces 36 and 40 allow considerable relative lateral displacement between the conduit sections without appreciable changes in the compressional force brought to bear on bearing and seal assembly 30. Coupling 20 as thus restrained permits conduit sections 22 and 24 to rotate about their longitudinal axes, conduit section 24 being further free to move laterally relative to conduit section 22, subject to the elastic restoring forces of resilient layers 30A of bearing and seal assembly 30.

Extension tube 32 provides a stagnation region in the fluid flow stream adjacent bearing and seal assembly 30. As previously mentioned, this feature of the present invention provides protection of the seal assembly from abrasive injury in the event the fluid contains particulate matter. It will be appreciated that the stagnation region is provided regardless of the direction of flow, although preferably flow is from the smaller to the larger diameter conduit section (from conduit section 22 to conduit section 24). However, when the coupling is not used with its longitudinal axis horizontal the larger section (24) should preferably be the lower, in order to prevent precipitated particulate matter from accumulating between extension tube 32 and conduit section 24, thereby preventing lateral motion between the two conduit sections.

Aside from functioning as a stagnation tube, extension tube 32 mechanically limits the extent of lateral displacement between conduit sections 22 and 24. To insure against failure of extension tube 32, the axial extent of the tube should preferably be less than the diameter of spherical surface 36, thereby confining any contact between the extension tube and conduit section 24 to the region of the tube nearest flange 26. It will be understood that this simple precaution minimizes the shearing stress on extension tube 32 due to its contact with conduit section 24.

It will be understood that various modifications may be made to the embodiment described without departing from the scope of the present invention. Thus, conical surface 38 and plane surface 42 may be interchanged, or both may be of similar form (e.g., both may be plane surfaces). Similarly, spherical surfaces 36 and 40 (and bearing and seal assembly 30) may be differently shaped surfaces of revolution in order to accommodate different relative motion between conduit sections 22 and 24. Thus, for instance, the purely lateral translational motion between the conduit sections, surfaces 36 and 40 and seal assembly 30 may be of planar form, while for axial displacements, cylindrical surfaces and bearing and seal assemblies may be used.

Figure 2:
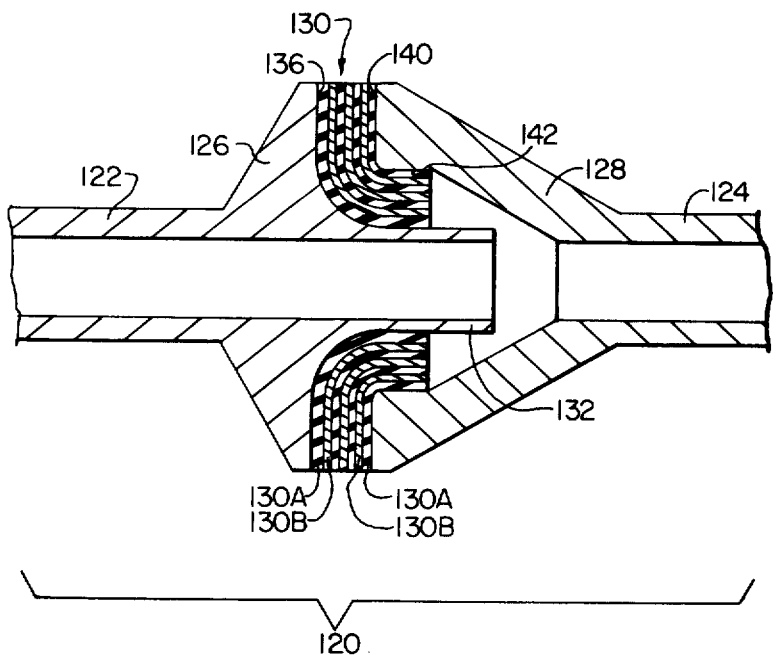
FIG. 2 is a view, similar to that of FIG. 1, of an alternative embodiment of the coupling of the present invention.

An arrangement particularly suitable for the transmission of large torques and which also illustrates a number of other possible design modifications is shown in FIG. 2. Fluid conductive coupling 120 incorporates conduit sections 122 and 124, provided respectively with external flanges 126 and 128, between which is disposed bearing and seal assembly 130. Except as noted hereinafter, coupling 120 is otherwise similar to coupling 20, index numbers prefixed with a "1" in the hundereds place corresponding to like numbers unprefixed.

Conduit sections 122 and 124 are equal diameter cylindrical tubes, flange 128 providing the overlapping portion of the latter conduit section, as will be described. In this particular embodiment, extension tube 132 forms a part of the torque transmission train, and consequently both its wall thickness and method of attachment to conduit section 122 must be consistent with the torque loading it will experience, as will be apparent to those skilled in the art. Preferably, therefore, extension tube 132 is a unitary portion of conduit section 122, although it will be appreciated it might be a separately formed part secured to conduit section 122, as by welding.

With the exception of surface 136, which corresponds to surface 36 of flange 26, flange 126 is similar to flange 26. Surface 136 is in the form of a single-flanged bobbin or "top hat" formed in flange 26 and extension tube 132 (i.e., it exhibits a substantially flat circular surface concentric with and normal to the axis of conduit section 122 which smoothly merges, by a quarter round fillet, into the exterior surface of the extension tube).

Conduit section 124 is provided with an external flange 128 in the form of a funnel concentric with and in communication with the conduit section. Flange 128 terminates in a substantially flat surface 140 distal from conduit section 124, and is povided with an interior cylindrical surface 142 adjacent and smoothly faired into surface 140. Surface 140 is disposed normal to and concentric with the axis of conduit section 124 and has an outer diameter equal to that of flange 126. Surface 142 is concentric with the axis of conduit section 124 and has a diameter chosen to be equal to the sum of the outside diameter of extension tube 132 plus twice the thickness of bearing and seal assembly 130, to be described. The axial extent of surface 142 (and extension tube 132) is chosen on the basis of the desired mechanical properties of the bearing and seal, as will be described. It will be understood that the extent of the interior taper of flange 128 between surface 142 and the interior of conduit section 124 is chosen to be gradual enough to freely clear extension tube 132 and provide a stagnation region bounded by the extension tube, bearing and seal assembly 130, and the interior of the flange.

Bearing and seal assembly 130 is in the form of a single-flanged bobbin, the inner diameter of which is dimensioned to fit over the outside of extension tube 132 and conform to surface 136. Bearing and seal assembly 130 is a laminated structure of graduated diameter bobbin-shaped alternating layers, 130A and 130B, of resilient and rigid material, respectively.

It should be noted that the contact areas between bearing and seal assembly 130 and flanges 126 and 128 depend not only on the outer and inner diameters of the flanges, but on the axial extent of extension tube 132 and surface 142 contacted by the flange. This may be contrasted with the contact area between bearing and seal assembly 30 and flanges 26 and 28, which depends merely on outer and inner diameters. Inasmuch as the pressure and torque loading which can be accommodated by the laminated bearing depends, among other things, on the contact area, it follows that the configuration of coupling 120 may be adapted, by increasing the extent of extension tube 132, surface 142, and the cylindrical portion of bearing and seal assembly 130, to withstand greater loads within a given diameter structural envelope than can the configuration of coupling 20. It should be noted, however, that the construction of coupling 120 does not provide for articulation at the coupling, as does coupling 20.

Since these and other changes may be made in the above described apparatus without departing from the scope of the invention herein involved, it is intended that all matter contained in the above description or shown in the accompanying drawing shall be interpreted in an illustrative and not a limiting sense.

I claim:

1. A flexible fluid-conductive coupling for use with a fluid transfer system including first and second conduits to be joined for fluid flow therebetween, said coupling comprising:
   a first flange fixedly connected to and extending radially outward from said first conduit;
   a second flange fixedly connected to and extending radially outward from said second conduit;
   opposing first and second bearing surfaces disposed respectively on said first and second flanges and in spaced relation relative to one another;
   bearing and sealing means for fixedly and flexibly connecting said first and second flanges consisting of alternating bonded laminae of resiliently deformable elastomer and substantially rigid material, said bearing and sealing means bonded between and to the first and second bearing surfaces whereby said bearing and sealing means accommodates misalignment between the first and second conduits; and
   an extension tube fixedly connected to one of the conduits and disposed within and radially spaced from the other of the conduits at least for a portion of its axial length; said extension tube for preventing the obstruction, due to excessive misalignment of the first and second conduits, of flow of the fluid therebetween and for establishing a fluid stagnation region thereby protecting the bearing and sealing means from abrasive injury due to flowing particulate matter in the fluid stream.

2. The flexible fluid-conductive coupling of claim 1 wherein the extension tube forms a part of a torque transmission train.

3. The flexible fluid conductive coupling of claim 1 wherein the first and second flanges are each of a one-piece construction.

4. The flexible fluid-conductive coupling of claim 1 wherein the first conduit is the conduit to which the extension tube is connected, and the first bearing surface is disposed about and is coaxial with the first conduit and is configured in the shape of a spherical segment, concave in the general direction of the second conduit.

5. The flexible fluid-conductive coupling of claim 4 wherein the first bearing surface has a radius greater than half the axial length of the extension tube so as to provide clearance for the accommodation of misalignment of the first and second conduits.

6. The flexible fluid-conductive coupling of claim 5 wherein the first conduit is the conduit to which the tube is connected, and the second bearing surface is disposed about and coaxial with the second conduit and is configured in the shape of a spherical segment, convex in the general direction of the first conduit.

7. The flexible fluid-conductive coupling of claim 1 wherein the extension tube threadedly engages the first conduit.

8. The flexible fluid-conductive coupling of claim 7 wherein the extension tube and the first conduit have substantially equal inner diameters.

9. The flexible fluid conductive coupling of claim 7 wherein the first and second flanges are integral with the first and second conduits respectively.

10. A flexible fluid-conductive coupling for use with a fluid transfer system including first and second conduits to be joined for fluid flow therebetween, said coupling comprising:
   a first flange fixedly connected to and extending radially outward from said first conduit;
   a second flange fixedly connected to and extending radially outward from said second conduit;
   opposing first and second bearing surfaces disposed respectively on said first and second flanges and in spaced relation relative to one another;
   bearing and sealing means comprising alternating laminae of resiliently deformable elastomer and substantially rigid material, said bearing and sealing means bonded between and to the first and second bearing surfaces whereby said bearing and sealing means accommodates misalignment between the first and second conduits;
   an extension tube fixedly connected to one of the conduits and disposed within and radially spaced from the other of the conduits at least for a portion of its axial length; said extension tube for preventing the obstruction, due to excessive misalignment of the first and second conduits, of flow of the fluid therebetween and for establishing a fluid stagnation region thereby protecting the bearing and sealing means from abrasive injury due to flowing particulate matter in the fluid stream; and
   wherein the second bearing surface has a radius less than that of the first bearing surface by an amount approximately equal to the axial thickness of the bearing and sealing means, said radii allow relative lateral displacement between the first and second conduits without appreciable change in the compressional force brought to bear on the bearing and sealing means, and the coupling permits the first and second conduits to rotate about their longitudinal axes and move laterally relative to one another, subject to the restoring forces of the elastomer in the assembly.

11. A flexible fluid-conductive coupling for use with a fluid transfer system including first and second conduits to be joined for fluid flow therebetween, said coupling comprising:
   a first flange fixedly connected to and extending radially outward from said first conduit;
   a second flange fixedly connected to and extending radially outward from said second conduit;
   opposing first and second bearing surfaces disposed respectively on said first and second flanges and in spaced relation relative to one another;
   bearing and sealing means comprising alternating laminae of resiliently deformable elastomer and substantially rigid material, said bearing and sealing means bonded between and to the first and second bearing surfaces whereby said bearing and sealing means accommodates misalignment between the first and second conduits;
   an extension tube fixedly connected to one of the conduits and disposed within and radially spaced from the other of the conduits at least for a portion of its axial length; said extension tube for preventing the obstruction, due to excessive misalignment of the first and second conduits, of flow of the fluid therebetween and for establishing a fluid stagnation region thereby protecting the bearing and sealing means from abrasive injury due to flowing particulate matter in the fluid stream; and
   wherein the extension tube includes, along an axial portion thereof adjacent to the first conduit, a third bearing surface, and wherein the first bearing surface is a substantially flat circular surface concentric with and normal to the axis of the first conduit and merges into the third bearing surface which is disposed substantially perpendicularly thereto.

12. The flexible fluid-conductive coupling of claim 11 wherein the second conduit includes a funnel-shaped inner surface, and the second flange includes a substantially flat surface substantially parallel to the first bearing surface and distal from the second conduit, and an interior cylindrical surface concentric with the second conduit and disposed between said funnel-shaped surface and said flat surface; and the bearing and sealing means is in the form of a single-flanged bobbin of similarly-shaped laminae with its radially-outward portion extending substantially parallel to the first bearing surface and its radially-inward portion parallel to the third bearing surface, said bearing and sealing means disposed between the first bearing surface and the flat surface and between the third bearing surface and the cylindrical surface.

* * * * *